United States Patent [19]

Strasser

[11] Patent Number: 4,844,992
[45] Date of Patent: Jul. 4, 1989

[54] CURRENT CONNECTION DEVICE

[75] Inventor: Karl Strasser, Erlangen, Fed. Rep. of Germany

[73] Assignee: Siemens Aktiengesellschaft, Berlin & Munich, Fed. Rep. of Germany

[21] Appl. No.: 248,432

[22] Filed: Sep. 23, 1988

[30] Foreign Application Priority Data

Sep. 24, 1987 [DE] Fed. Rep. of Germany ....... 3732235

[51] Int. Cl.4 .......................... H01M 8/02; H01M 2/20
[52] U.S. Cl. ...................................... 429/34; 429/122; 428/625
[58] Field of Search .................... 429/44, 34, 35, 36, 429/38, 39, 122; 428/625

[56] References Cited

U.S. PATENT DOCUMENTS 3,775,184 11/1973 Kuhl et al. ............................ 429/38
4,317,864 3/1982 Strasser ................................. 429/36

Primary Examiner—Donald L. Walton
Attorney, Agent, or Firm—Kenyon & Kenyon

[57] ABSTRACT

A current connection device for use in batteries formed from a plurality of electrochemical cells wherein the electrodes in each cell are to have pressure cushions for isostatic compression and the cells are to operate at increased pressure levels. The device comprises two contact sheets welded to the sides of a metal plate, one to a side, the metal plate with its contact sheets being surrounded by an elastomer frame. A metallic current connection strip is coupled to the plate and extends through the frame to permit coupling the cells together.

3 Claims, 1 Drawing Sheet

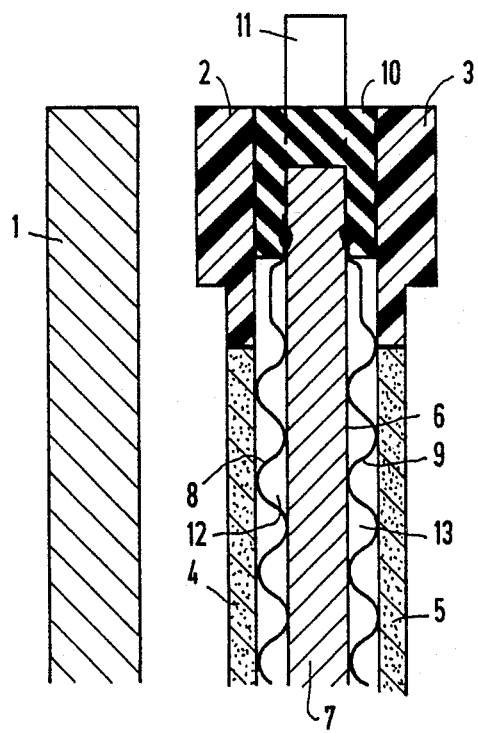

CURRENT CONNECTION DEVICE

This invention relates to a current connection device for coupling electrochemical cells together in a battery. More particularly, the device is for use in fuel cells and has metallic contact elements in the form of metallic contact sheets which form pressure cushions.

BACKGROUNDS OF THE INVENTION

A battery which uses metallic contact bodies which form pressure cushions is disclosed in U.S. Pat. No. 4 317 864. The contact bodies fulfill two functions: they collect the current from each cell and they have a hollow chamber into which a pressurized medium may be introduced so that uniform compression is exerted on the catalyst material in the adjacent cells.

The electrochemical cells in such a battery are stacked one upon another in a bipolar array, with one pressure plate located at either end of the stack. Between the pressure plate and the pressure cushion of the first electrochemical cell a metal plate with an outward projecting strip is located. This plate is called the pole plate and serves as the current collection and battery connection point.

Electrical contact between the pole plate and the contact bodies (pressure cushions) is established by pressurizing the hollow chamber in the contact bodies. Either a pressurized gas or liquid can be used. However, reliable electrical contact continues only so long as the battery is operated in an atmosphere whose pressure is below that maintained in the contact bodies. If ambient pressure exceeds the pressure in the contact bodies, the current is either interrupted or the contact body, because of the loss of contact area, overloads thermally. Thus, the functional reliability of the battery is endangered.

One attempt to solve the foregoing problems consisted of gluing the pole plates into a plastic plate. The pole plate was then sealed in an elastomer frame and replaced in the battery. The space between the pole plate and the pressure cushion was thereby sealed off from the ambient pressure and changes in the ambient pressure no longer affected the contact.

That solution, however, had several disadvantages. First, gluing the pole plate into a plastic plate involved problems relating to the different coefficients of heat expansion in the materials and the dimensional changes attendant hereto. Mechanical tension caused by the gluing process and thermal stresses occurring during use generated tears and, finally, pressure leakage between the outside environment and the contact area, which impaired battery operation. Second, in order to insure the battery's functioning despite the small leaks, the space between the pole plate and the pressure cushion needed to be vented to ambient atmosphere. To maintain a relatively constant pressure within this space required costly monitoring and pressurizing equipment. Third, as multiple cells exist in each stack, the construction method was relatively costly.

SUMMARY OF THE INVENTION

It is an object of this invention to create a current connection device for batteries using electrochemical cells, the device having contact bodies functioning as pressure cushions for generating isostatic contact pressure and which contact bodies permit the connection of cell groups in parallel.

To achieve this and other objects, the present invention comprises a metal plate to which two contact sheets are welded, one on each side of the plate and nearly covering the entire surface area of the plate. In turn, the plate with its welded contact sheets is provided with an elastomer frame around its perimeter. A metallic strip is welded to the plate and extends through the frame.

In this manner the pole plate is integrated into the pressure cushion. The parts and structure are easy to fabricate and overcome the limitations of the prior art.

In a particularly advantageous embodiments, the plate and strip are composed of copper and the contact sheets are stamped in a wave-like pattern.

Other and further objects of this invention will become obvious upon an understanding of the illustrative embodiments about to be described with reference to the figure or will be indicated in the appended claims, and further advantages not referred to herein will occur to one skilled in the art upon employment of the invention in practice.

DESCRIPTION OF THE FIGURE

The FIGURE shows a cross-section of a battery cell containing the present invention.

DETAILED DESCRIPTION OF THE INVENTION

Referring to the FIGURE, a cross section of a portion of a battery comprising the present invention is shown. Pressure plate 1 is located at the end of the battery. Located between it and its mirror image at the other end of the battery (not shown) are a plurality of battery cells, each cell comprised of cell frames 2 and 3, electrodes 4 and 5, and current connection device 6. In the cells located adjacent to pressure plates at the respective ends of the battery, cell frame 2 and electrode 4 or cell frame 3 and electrode 5 are omitted as required to maintain correct polarity.

Current connection device 6 is comprised of metal plate 7, two contact sheets 8 and 9 and elastomer frame 10 which surrounds the edges of plate 7. Contact sheets 8 and 9 are welded to metal plate 7. Metal plate 7 has a metallic strip 11 which extends through frame 10 to outside the cell. Strip 11 is used for external current connection and preferably extends radially from the cell. Chambers 12 and 13 between metal plate 7 and contact sheets 8 and 9 hold fluid which is used to generate pressure in the cells.

Pressure plate 1 is comprised of plastic or metal covered with plastic. Metal plate 7, together with strip 11, is also known as the pole plate, is comprised of copper approximately 1 mm thick, and is covered by welded-on contact sheets 8 and 9. Sheets 8 and 9 are only approximately 0.2 mm thick and flexible and can be comprised of nickel. The sheets are stamped in a wave pattern, with wave heights of approximately 1 mm, thereby forming gas guide paths for the gaseous reactants of the battery. These reactants may be hydrogen and/or oxygen and are supplied to electrodes 4 or 5 under a pressure of about 2 bar. The battery's electrolyte can be potassium hydroxide. The pressure medium supplied to chambers 12 and 13 may be nitrogen supplied at a pressure of about 3 bar.

As many apparently widely different embodiments of this invention may be made without departing from the spirit and scope thereof, it is to be understood that the invention is not limited to the specific embodiments thereof except as defined in the appended claims.

What is claimed is:

1. A current connection device for use in electrochemical battery cells, particularly fuel cells, comprising metal plate means;

contact sheet means welded to both sides of the plate means for providing pressure cushions to the cells;

elastomer frame means surrounding the plate means and contact sheet means, completely sealing all edges on both sides of the plate means; and metal strip means attached to the plate means projecting through the frame means to outside the battery cell for providing a current connection point.

2. The device of claim 1 wherein the plate means and strip means are comprised of copper.

3. The device of claim 1 wherein the contact sheet means are formed in a wave-like pattern.

* * * * *